(12) United States Patent
Mercx et al.

(10) Patent No.: US 7,845,291 B2
(45) Date of Patent: Dec. 7, 2010

(54) CONTROL METHOD FOR WASTE INCINERATION PLANTS WITH AUXILIARY BURNER OPERATION

(75) Inventors: Josef Mercx, Baden (CH); Peter Benz, Bonstetten (CH)

(73) Assignee: Von Roll Umwelttechnik AG (CH)

( * ) Notice: Subject to any disclaimer, the term of this patent is extended or adjusted under 35 U.S.C. 154(b) by 780 days.

(21) Appl. No.: 11/600,722

(22) Filed: Nov. 17, 2006

(65) Prior Publication Data

US 2007/0125283 A1    Jun. 7, 2007

(30) Foreign Application Priority Data

Nov. 19, 2005    (EP) ................... 05025297

(51) Int. Cl.
*F23N 5/00* (2006.01)
*B09B 3/00* (2006.01)
*F23G 5/00* (2006.01)

(52) U.S. Cl. .................. 110/187; 110/101 CF; 110/346; 110/235

(58) Field of Classification Search .................. 110/252, 110/187, 346, 101 CF, 235; 700/209
See application file for complete search history.

(56) References Cited

U.S. PATENT DOCUMENTS 4,464,111 A * 8/1984 Rastogi et al. .............. 110/212
4,861,262 A * 8/1989 Gitman et al. .............. 110/346
5,230,293 A    7/1993 Schirmer
5,279,263 A * 1/1994 Cameau et al. .............. 122/480
5,634,412 A    6/1997 Martin et al.
6,101,958 A * 8/2000 Beckmann et al. .......... 110/346
6,712,012 B1 * 3/2004 van Kessel .................. 110/346
2007/0225864 A1 * 9/2007 Bardi et al. .................. 700/274

FOREIGN PATENT DOCUMENTS

| DE | 1 279 880 | 10/1968 |
| EP | 0 213 980 | 3/1987 |
| EP | 0 499 976 | 8/1992 |
| EP | 0 696 708 | 2/1996 |
| EP | 0 860 657 | 8/1998 |

OTHER PUBLICATIONS

EP 05 02 5297.2 European Patent Office Search Report, May 16, 2006.

* cited by examiner

*Primary Examiner*—Kenneth B Rinehart
*Assistant Examiner*—David J. Laux
(74) *Attorney, Agent, or Firm*—Hershkovitz & Associates, LLC; Abraham Hershkovitz

(57) ABSTRACT

A control method for operating a waste incineration plant with a auxiliary burner is disclosed. A steam power is regulated as a function of a burner power of the auxiliary burner. For this purpose, on the basis of the burner power, a burner steam power is determined, which represents the contribution generated by the auxiliary burner fire to the steam power of the waste incineration plant.

12 Claims, 5 Drawing Sheets

CONTROL METHOD FOR WASTE INCINERATION PLANTS WITH AUXILIARY BURNER OPERATION

CROSS-REFERENCE TO RELATED APPLICATIONS

The present application claims priority under 35 U.S.C. 119 of European Patent Application No. 05 025 297.2, filed on Nov. 19, 2005, the disclosure of which is expressly incorporated by reference herein in its entirety.

BACKGROUND OF THE INVENTION

1. Field of the Invention

The present invention relates to a control method and a combustion control system for operating a waste incineration plant and to a waste incineration plant.

Waste incineration plants serve, in general, for the compacting, hygienic treatment and mineralization of waste and for the concentration and inertization of pollutants contained in the waste, along with emissions which are preferably environmentally compatible. The energy occurring during waste incineration and the residues occurring at the end of incineration may be delivered for multilayered utilization or exploitation. Thus, for example, the calorific value of the waste may be utilized, by means of steam generation, for the provision of process steam or distant heat and for generating electric energy. The slag residue occurring at the end of the incineration process may be used as a useful material, for example in roadbuilding.

2. Discussion of Background Information

A control method for operating a waste incineration plant is described, for example, in EP0499976. In this method, a uniform heat or steam generation is achieved via a multiloop control device in which the generated steam power (steam quantity per unit time) is conducted as the main controlled variable and the oxygen content in the flue gas is conducted as an auxiliary controlled variable. For this purpose, a combustion control system capable of carrying out the method is equipped with a measurement device for the steam quantity and the oxygen content of the flue gas and with a low-speed main controller for the steam power. A high-speed $O_2$ controller is connected in parallel with the main controller, and its outputs are connected to the ram, grate and primary-air flaps as actuators.

To minimize the environmental pollution caused by exhaust gases from a waste incineration plant, statutory regulations stipulate increasingly that a minimum firing temperature, as it is known, should not be undershot, since only by adhering to this minimum firing temperature is an incomplete combustion of the exhaust gases avoided and, for example, the fraction of organic substances in the exhaust gases limited. To ensure the minimum firing temperature which may be set, for example, at 850° C., auxiliary burners are used in modern waste incineration plants. Auxiliary burners, by burning fossil fuels, for example oil or gas, make it possible to keep the firing temperature above the corresponding minimum value.

When auxiliary burners are used, in particular, two aspects must be borne in mind:

1. A burner steam power as a proportion of the steam power is generated as a function of the burner power of the auxiliary burner and influences the overall combustion control system which normally manages without the ignition of auxiliary burners; and 2. on account of the uniform quality of the fuels for the auxiliary burner and because the burner power is therefore easy to control, conventional combustion systems tend, with a decreasing oxygen content in the flue gas, to brake the incineration of waste and thereby tend to replace the steam power from the waste incineration by a burner steam power generated by the auxiliary burner.

The result of this is that, in existing combustion control systems, a change often has to be made to a hand-controlled operating mode, and the return from operation with a auxiliary burner to normal waste incineration operation is delayed for an unnecessarily long time and increased operating costs, along with reduced waste throughput, are thereby incurred.

SUMMARY OF THE INVENTION

The object, therefore, is to provide a control method and a combustion control system for operating a waste incineration plant, while maintaining a minimum firing temperature, along with a minimal use of auxiliary burners.

This object is achieved by means of a control method and a combustion control system for operating a waste incineration plant and also a waste incineration plant according to the present invention. Particularly preferred embodiments are equipped with features mentioned herein.

In a control method or a combustion control system according to the present invention for operating a waste incineration plant, a burner power of a auxiliary burner which is ignited in order to maintain a minimum firing temperature is incorporated as a measurement variable. In this case, for example, the fuel consumption of the auxiliary burner serves as a measure of the burner power. A burner steam power is calculated from the burner power and reproduces the contribution generated by the auxiliary burner fire to an overall steam power of the waste incineration plant.

The steam power of the waste incineration plant is regulated correspondingly as a function of the burner power and of the respective operating point in a firing graph. For this purpose, in the case of low steam powers, a steam power contribution from waste incineration is left virtually as it is, whereas the overall steam power is increased by the amount of the burner power. This takes place, for example, in that a corresponding steam power desired value of a steam controller is increased by the amount of the burner power. If, then, the sum of the steam power contribution of waste incineration and of the burner steam power approaches a maximum steam power, the overall steam power from waste incineration and support firing is increased at most up to the maximum steam power. If the maximum steam power is reached or overshot as a result of the cut-in of the auxiliary burner, steam production is not increased any further, but, instead, the waste throughput is cut back.

The control method thereby ensures operation so as to maintain a minimum firing temperature, along with a minimal use of the auxiliary burner. As a result, fossil fuels for operating the auxiliary burner and consequently costs are saved. Depending on the firing state, it becomes possible quickly and automatically to return from operation with a auxiliary burner to normal operation without a auxiliary burner, while maximizing the waste throughput.

The control method according to the present invention and the combustion control system according to the present invention are preferably designed as a supplement to the control known from EP0499976, to the content of which reference is made here. They may, however, also be used on the basis of other controls.

BRIEF DESCRIPTION OF THE DRAWINGS

Particularly preferred embodiments of the invention are explained below with reference to the purely diagrammatic drawing in which.

DETAILED DESCRIPTION OF THE PRESENT INVENTION

Figure 1:
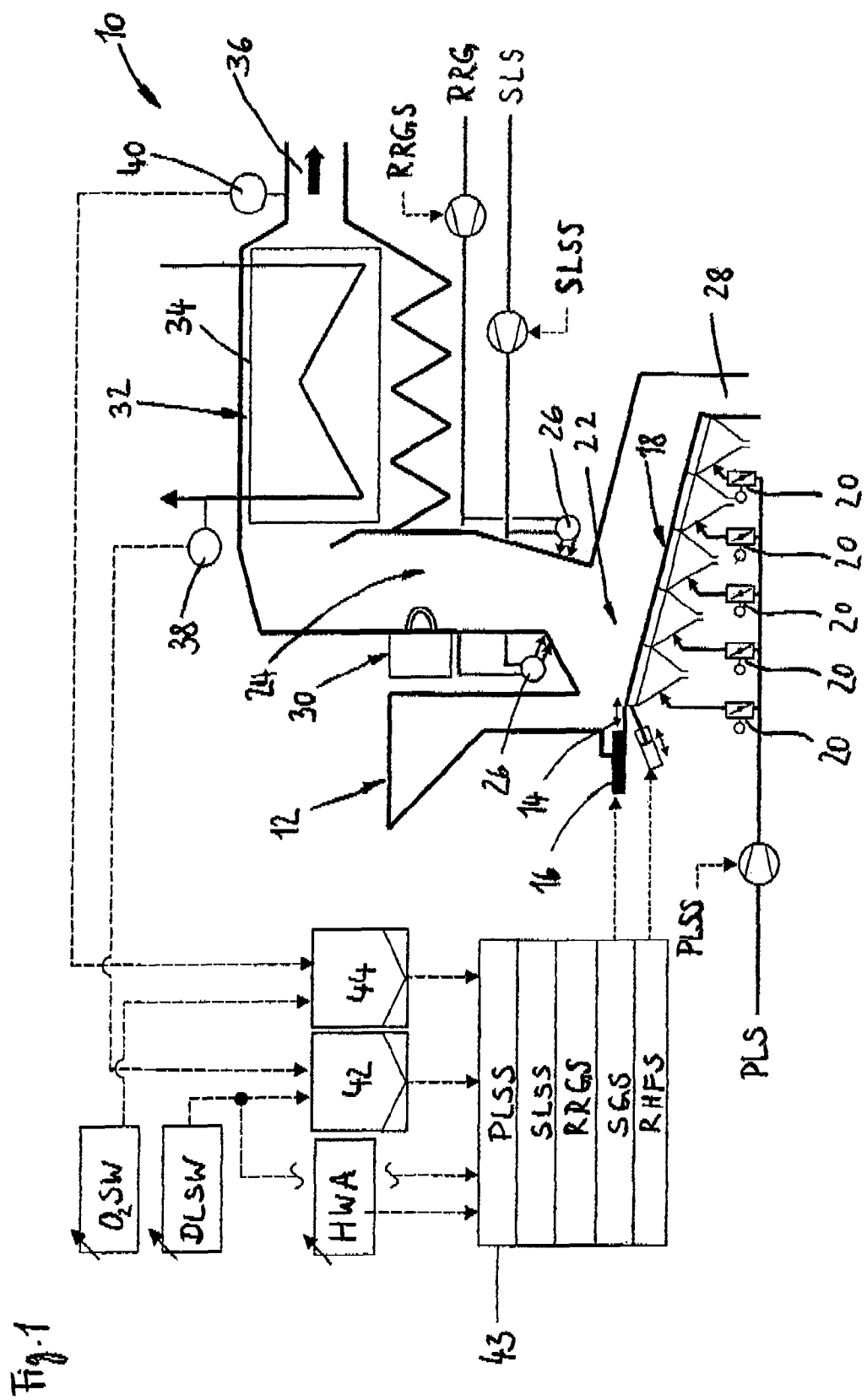
FIG. 1 shows the set-up of a conventional waste incineration plant with a auxiliary burner and with elements of a known combustion control system.

FIG. 1 shows a waste incineration plant 10 which, for feeding with waste, has a waste bunker 12 with a funnel-shaped lower orifice, through which the waste passes, with the assistance of gravity, onto a feed table 14. The waste is pushed onto the following incineration grate 18 from the feed table 14 by means of a delivery ram 16. The incineration grate 18 shown is designed as a movable feeding grate. Below the incineration grate 18 are located a plurality of primary-air zones, through which the primary air necessary for incineration is introduced via five primary-air flaps 20 shown through the incineration grate 18 into the furnace 22 located above. The number of primary-air flaps 20 may vary and preferably amounts to 1 to 10.

The actual incineration takes place in the furnace 22. The furnace 22 opens upwardly into an afterburn chamber 24, by means of which flue gases occurring during incineration can burn out completely and escape. Secondary air is injected via secondary-air nozzles 26 on both sides in the orifice of the furnace 22 to the afterburn chamber 24 in order to swirl the flue gases arising from incineration. By virtue of a specific arrangement and orientation of the secondary-air nozzles 26 and a contraction of the walls of the afterburn chamber 24, midstream incineration, as it is known, is implemented. In midstream incineration, on the one hand, the waste and the flue gases are conducted in the same direction from the feed table 14 towards the furnace 22 and, on the other hand, flue gases from the direction of the slag shaft 28 arranged at the end of the incineration grate 18 are conducted to the furnace 22 in the opposite direction to the combustible material.

A auxiliary burner 30 is located above the secondary-air nozzles 26 in the afterburn chamber 24. As already mentioned above, the auxiliary burner 30 is operated by means of fossil fuels and serves for maintaining a minimum firing temperature for the complete oxidation of the flue gases. The firing temperature is determined by means of a temperature sensor arranged in the afterburn chamber and not shown in FIG. 1.

A steam generator 34 is arranged in a chamber-like steam generator unit 32 following the afterburn chamber 24. The steam generator 34 is a heat exchanger for steam generation, in which thermal energy from the flue gases is utilized for the generation of steam. The steam may be supplied via a pipeline system to turbines, not shown, in which the thermal energy of the steam is converted into electric energy. The flue gases cooled in the steam generator unit 32 are discharged for further purification via an exhaust shaft 36.

For a uniform provision of electrical energy, uniform steam production in the steam generator 34 is of fundamental importance. Uniform steam production is achieved, in turn, only as a result of uniform combustion. Furthermore, uniform combustion affords economic advantages, such as, for example, a lower load on plant components on account of a more uniform temperature profile, and ecological advantages, since, in uniform combustion, lower quantities of pollutants arise. The cause of combustion which per se is not uniform is, in general, changing waste qualities. Where damp waste or waste with a low calorific value is concerned, a combustion control system for controlling the waste incineration must influence corresponding manipulated variables, in order to ensure a uniform steam production, while maintaining the minimum firing temperature.

For this purpose, as shown in FIG. 1, at least two measurement variables are monitored: on the one hand, by means of a steam quantity measurement 38 assigned to the steam generator 34, the steam quantity produced per unit time or steam power DL, and, on the other hand, by means of an oxygen sensor 40 arranged on the exhaust shaft 36, the oxygen content of the flue gases. The combustion control system has a steam controller 42 and an oxygen controller 44. Manual intervention possibilities for setting a steam power desired value DLSW, an oxygen desired value O2SW and a calorific value adaption HWA are provided for the operator. A set value calculation unit 43 of the combustion control system provides a primary-air stream set value PLSS for a primary-air stream PLS, a secondary-air stream set value SLSS for a secondary-air stream SLS, a recirculation flue gas stream set value RRGS for recirculating flue gases RRG, if present, a ram speed set value SGS and a grate stroke frequency set value RHFS.

Figure 2:
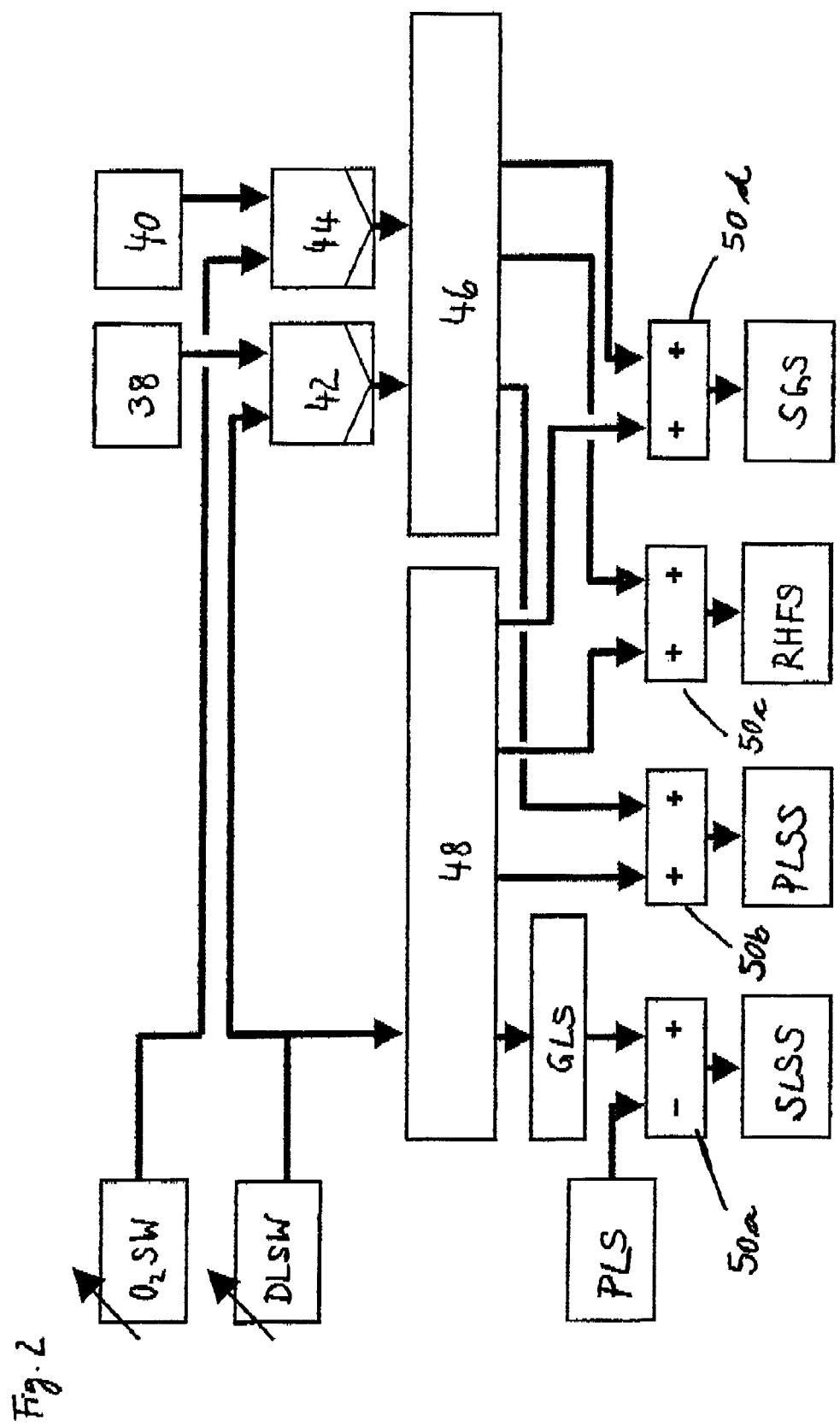
FIG. 2 shows a block diagram of the known combustion control system.

FIG. 2 illustrates in more detail the combustion control system known from EP0499976. As already mentioned, in the control system, measurement values of the steam quantity measurement 38 and of the oxygen sensor 40 and also of the steam power desired value DLSW set by manual intervention and of the oxygen desired value O2SW are transferred to the steam controller 42 and the oxygen controller 44. Initial values of the steam controller 42 and of the oxygen controller 44 are transmitted to a calculation unit 46 for correction set values of the primary-air stream PLS, of the grate stroke frequency RHF and of the ram speed SG. In parallel with this, in a further calculation unit 48, basic set values for an overall air stream GLS, the primary-air stream PLS, the grate stroke frequency RHF and the ram speed SG are determined.

In following linkage units 50a, 50b, 50c, 50d, the basic set values are then combined with the correction set values: in a linkage unit 50a the set value for the overall air stream GLS and a measurement value for the primary-air stream PLS for calculating the secondary-air stream set value SLSS, in a linkage unit 50b the basic set value and the correction set value for the primary-air stream PLS for calculating the primary-air stream set value PLSS, in a linkage unit 50c the basic set value and the correction set value for the grate stroke frequency RHF for calculating the grate stroke frequency set value RHFS, and, in a linkage unit 50d, the basic set value and the correction set value for the ram speed SG for calculating the ram speed set value SGS.

Figure 3:
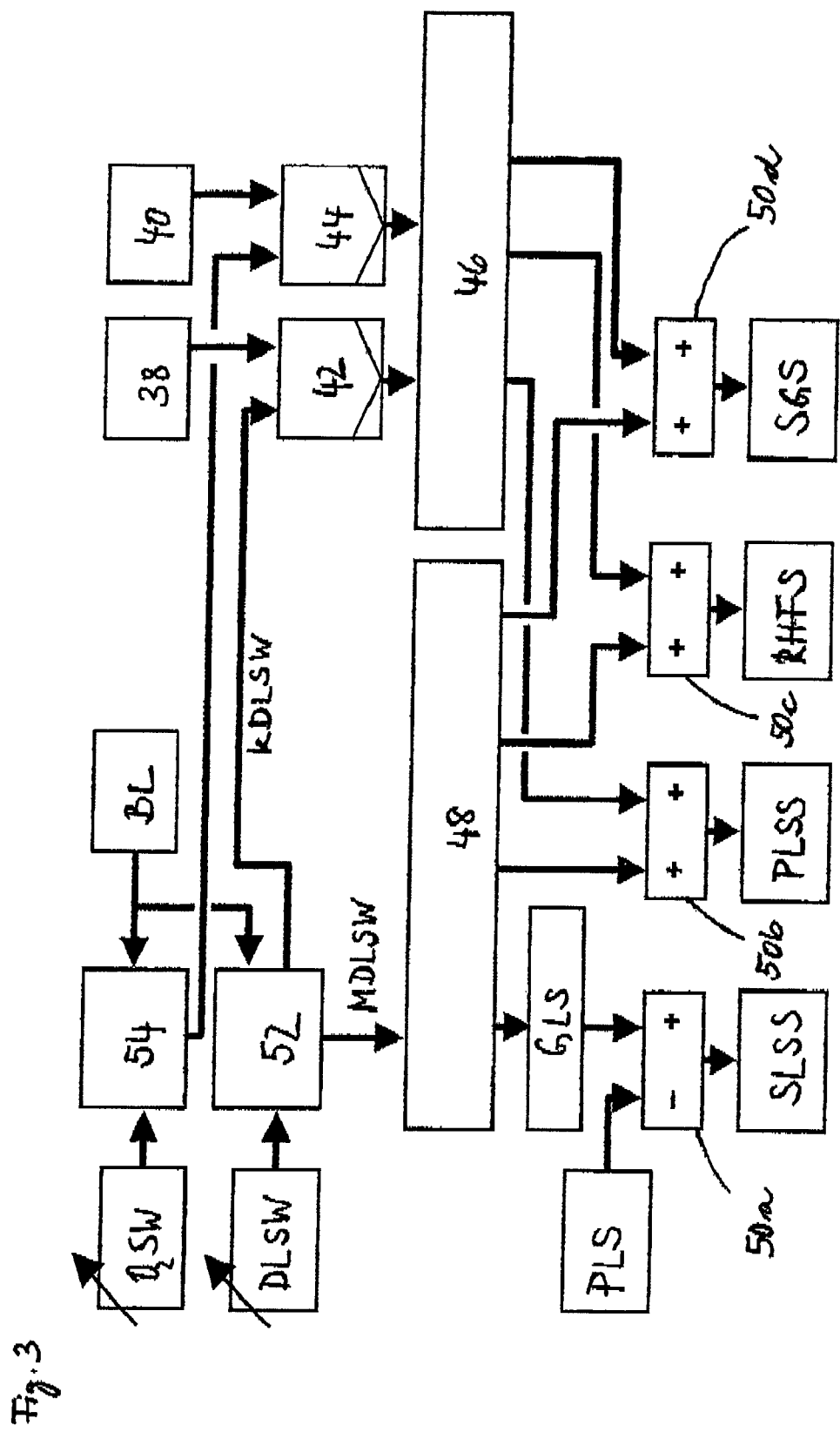
FIG. 3 shows a block diagram of a combustion control system for implementing a control method according to the present invention, using an oxygen desired value correction unit and a burner steam power compensation unit.

FIG. 3 shows a combustion control system capable of carrying out the control method according to the present invention. In this embodiment, on the one hand, a burner steam power compensation unit 52 is inserted between the manual intervention for the steam power desired value DLSW and the calculation unit for the basic set values 48 or the steam controller 42. This burner steam power compensation unit 52 is described in detail in connection with FIG. 4. On the other hand, an oxygen desired value correction unit 54 is arranged between the manual intervention for the oxygen desired value O2SW and the oxygen controller 44. Both the burner steam power compensation unit 52 and the oxygen desired value correction unit 54 receive as an input variable the burner power BL of the auxiliary burner 30. The burner power BL is in this embodiment determined on the basis of the actual gas or oil consumption of the auxiliary burner 30. In this embodiment, for example, a fuel throughflow, a fuel volume flow or a fuel filling level serve as suitable measurement variables for the burner power BL.

The oxygen desired value correction unit 54 takes into account the fact that, when the auxiliary burner 30 is ignited, the oxygen content in the then mixed waste/auxiliary burner fire is lower than in a waste fire without a auxiliary burner fraction. A conventional combustion control system, when the oxygen content decreases, will attempt to brake the incineration and thereby tends to replace more steam power from waste incineration by a burner steam power BDL generated by the auxiliary burner 30. On the basis of the measurement value for the burner power BL, the oxygen desired value correction unit 54 compensates this effect and thereby prevents the tendency toward a greater consumption of fossil fuels for the auxiliary burner 30.

Figure 4:
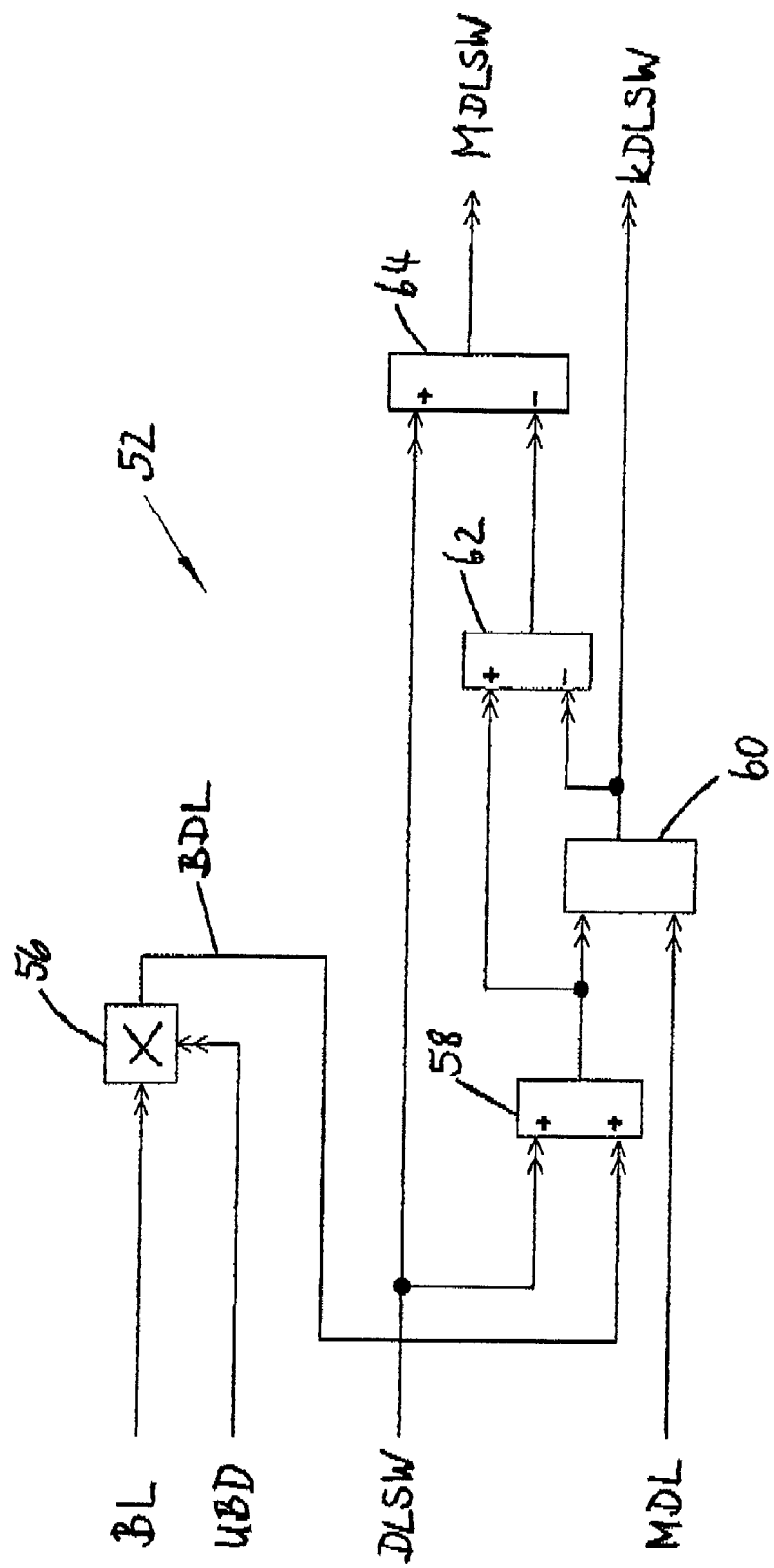
FIG. 4 shows a block diagram of the burner steam power compensation unit.

The set-up of the burner steam power compensation unit 52 is illustrated in detail in FIG. 4. In addition to the input variables, shown in FIG. 3, for the measurement value of the burner power BL and for the steam power desired value DLSW set by manual intervention, the burner steam power compensation unit 52 processes as input parameters a conversion factor "burner power-to-burner steam power" UBD and an input parameter "maximum steam power" MDL. The maximum steam power MDL is predetermined, for example, by the plant specification. Initial values of the burner steam power compensation unit 52 are two steam power desired values, to be precise a corrected steam power desired value kDLSW, which is transmitted to the steam controller 42, and a waste steam power desired value MDLSW, which is transferred to the calculation unit for basic set values 48. The corrected steam power desired value kDLSW in this case takes into account the burner steam power BDL, that is to say the contribution generated by the auxiliary burner 30 to the steam power. The waste steam power desired value MDLSW relates solely to the steam power generated as a result of waste incineration.

In a multiplication unit 56 of the burner steam power compensation unit 52, first, the burner power BL is multiplied by the conversion factor burner power-to-burner steam power UBD, in order to determine the burner steam power BDL. The burner steam power BDL is then added in an addition unit 58 to the steam power desired value DLSW set by the manual intervention of the operator. The result of the addition is subsequently compared with the maximum steam power MDL in a minimum value selection unit 60 and is transferred as a corrected steam power desired value kDLSW to the steam controller 42.

To calculate the waste steam power desired value MDLSW, first, the corrected steam power desired value kDLSW is subtracted from the result of the addition unit 58 in a first subtraction unit 62. The result after the first subtraction unit 62 is transferred to a second subtraction unit 64 and subtracted from the steam power desired value DLSW set by manual intervention. In this case, the steam power desired value DLSW is reduced whenever the sum of the predetermined steam power desired value DLSW and of the burner steam power BDL is greater than the maximum steam power MDL. The result of this second subtraction is then transferred as a waste steam power desired value MDLSW to the calculation unit for the basic set values 48.

Figure 5:
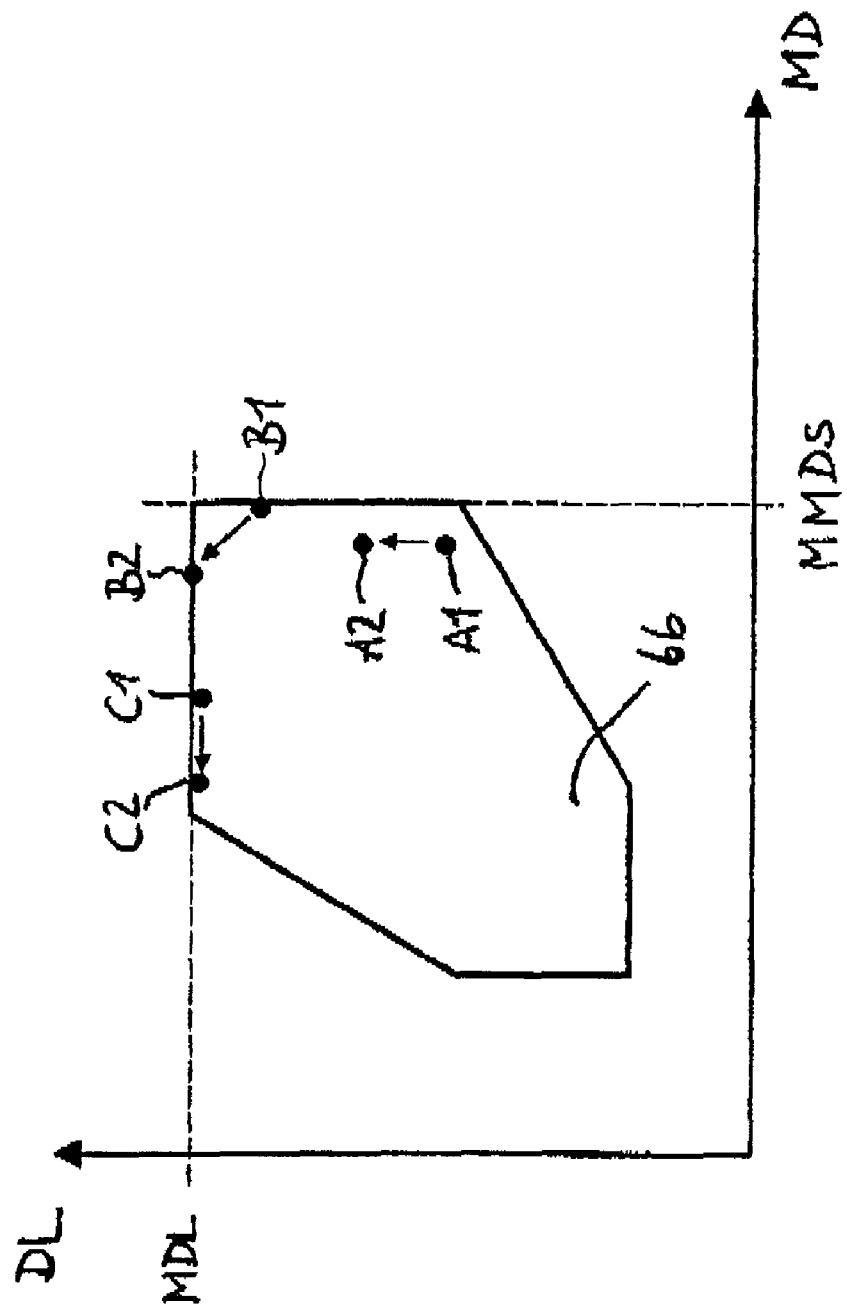
FIG. 5 shows a firing graph with initial positions A1, B1 and C1 without auxiliary burner operation and with end positions A2, B2 and C2 in the case of auxiliary burner operation which are regulated by means of the control method according to the present invention.

An explanation of the function of the burner steam power compensation unit 52 by means of a firing graph shown in FIG. 5 now follows. In the firing graph, the steam power DL is plotted against the waste throughput. The hexagonal region bordered by an unbroken line is the operating range 66 of the waste incineration plant. The functioning of the control method according to the invention is described below by means of three scenarios with initial positions A1, B1, C1 in the firing graph.

The first scenario starts in the initial position A1 near a maximum waste throughput MMDS and markedly below a maximum steam power MDL in the firing graph. If it is necessary to ignite the auxiliary burner 30 because the minimum firing temperature is undershot, the ram speed SG and the grate stroke frequency RHF and therefore the waste throughput MD are left virtually unchanged. However, the steam power DL rises, since the corrected steam power desired value kDLSW is then set to the sum of the steam power desired value DLSW set by manual intervention and of the burner steam power BDL. By contrast, the waste steam power desired value MDLSW remains unchanged and equal to the steam power desired value DLSW set by manual intervention. On account of the control action, the operating point is displaced from the initial position A1 to the end position A2, the quantity of waste supplied, its dwell time on the grate and the air supply remaining unchanged.

A second scenario commences in the initial position B1 of the operating point. The initial position B1 is located on the line of the maximum waste throughput MMDF and near the line of the maximum steam power MDL within the operating range 66. Once again, the firing temperature undershoots the minimum firing temperature, so that the auxiliary burner 30 has to be ignited. As a consequence, the sum of the calculated burner steam power BDL and of the steam power desired value DLSW set by the manual intervention of the operator overshoots the maximum steam power MDL. Then the minimum value selection unit 60 of the burner power compensation unit 52 fixes the value of the maximum steam power MDL as a corrected steam power desired value kDLSW. Consequently, the steam power DL rises at most to the value of the maximum steam power MDL. The waste steam power desired value MDLSW is assigned the steam power desired value DLSW set by the manual intervention of the operator, minus the difference value between the sum of the steam power desired value DLSW and the calculated burner steam power BDL and the maximum steam power MDL. A waste steam power desired value MDLSW reduced in this way brings about a reduction in the ram speed SG and in the grate stroke frequency RHF and, as a result, a cutback in the waste throughput MD. Moreover, on account of the reduced waste steam power desired value MDLSW, the basic set values for the overall air stream GLS and for the primary-air stream PLS are lowered, and therefore an overloading of the suction draft due to excessively large quantities of flue gas is avoided. The position of the operating point is displaced from B1 toward B2.

Starting from the position C1 which is located at the limit of the operating range 66 on the straight line of the maximum steam power MDL and in the case of a medium waste throughput, a third scenario arises when the auxiliary burner 30 is ignited. In this case, the position of the operating point C1 is transferred to the position C2. In a similar way to the second scenario, here, the burner power compensation unit 52 fixes the maximum steam power MDL, which is already virtually reached, as a corrected steam power desired value kDLSW. The waste steam power desired value MDLSW acquires the steam power desired value DLSW set by manual intervention, minus the difference arising, on the one hand, from the sum of the steam power desired value DLSW set by manual intervention and the calculated burner steam power BDL and, on the other hand, from the maximum steam power MDL. Consequently, once again, the end position C2 lies on the straight line of the maximum steam power MDL, but with a greatly reduced waste throughput MD. This is due to a greatly reduced waste steam power desired value MDLSW, thus leading, in turn, to reduced activities of the grate ram and air. Such a reaction is appropriate, in particular, since the use of a auxiliary burner in the case of a high steam power DL points to an insufficient calorific value of the waste or to other disturbances in the incineration sequence.

Three further scenarios arise when the minimum firing temperature is reached or overshot due to auxiliary burner use. In this case, first, the auxiliary burners 30 are switched off, whereupon the control method according to the invention transfers the operating point from one of the positions A2, B2 and C2 back to the positions A1, B1 and C1 in a similar way to that described in the first three scenarios.

All the scenarios discussed show that the control method according to the invention is suitable for reacting automatically to an ignition or switch off of auxiliary burners 30 and in this case, taking into account the burner steam power BDL generated by the auxiliary burner 30, for transferring the operating point of waste incineration in each case within the operating range 66 to an optimized position. This prevents the burner steam power BDL from permanently replacing steam power DL which is generated as a result of waste incineration. This ensures automated waste incineration operation, along with a minimized auxiliary burner use, fuel costs for the auxiliary burner firing being minimized and the waste throughputs MD being maximized, while at the same time a minimum firing temperature is maintained.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The invention claimed is:

1. A combustion control system for operating a waste incineration plant with a furnace, the combustion control system comprising:
   an auxiliary burner being substantially separated from the furnace and being ignited to maintain a minimum firing temperature;
   a steam controller which receives as input variables a steam power from a steam sensor assigned to a steam generator of the waste incineration plant and a steam power desired value, the steam controller generating set values for at least one of a primary-air stream, a secondary-air stream, a grate stroke frequency and a ram speed of the waste incineration plant as actuators; and
   a burner power compensation unit which receives a measured burner power of the auxiliary burner as an input variable and the output variable of which is supplied to the steam controller that regulates the steam power as a function of the burner power of the auxiliary burner, the measured burner power being determined based on an actual fuel consumption of the auxiliary burner,
   wherein a calculation of a burner steam power generated by the auxiliary burner takes place as a function of the burner power, and
   wherein the burner steam power is utilized for calculating a corrected steam power desired value and a waste steam power desired value.

2. The combustion control system as claimed in claim 1, wherein the corrected steam power desired value is set equal to the minimum, on the one hand, a predetermined maximum steam power, and, on the other hand, the sum of the burner steam power and a predetermined steam power desired value.

3. The combustion control system as claimed in claim 2, wherein the waste steam power desired value is set equal to the predetermined steam power desired value, minus a sum which is reduced by the amount of the corrected steam power desired value and which is obtained from the predetermined steam power desired value and the burner steam power.

4. The combustion control system as claimed in claim 3, wherein the corrected steam power desired value and the steam power measured by the steam sensor are transmitted to the steam controller and the waste steam power desired value is transmitted to a calculation unit for basic set values, linkage units determining a secondary-air stream set value, a primary-air stream set value, a grate stroke frequency set value and/or a ram speed set value by the linkage of output variables from the calculation unit for basic set values and the calculation unit for correction set values which receives as an input variable the output variable of the steam controller.

5. The combustion control system as claimed in claim 1, wherein there is a calculation unit for basic set values and there is a calculation unit for correction set values, and also with linkage units for determining a secondary-air stream set value, a primary-air stream set value, a grate stroke frequency set value and/or a ram speed set value, the burner power compensation unit calculating a waste steam power desired value and a corrected steam power desired value from input variables for a burner power of the auxiliary burner and from a predetermined steam power desired value.

6. The combustion control system as claimed in claim 5, wherein the burner power compensation unit is equipped with at least one multiplication unit for calculating a burner steam power from the burner power, with an addition unit, with a subtraction unit and with a minimum value selection unit.

7. The combustion control system as claimed in claim 1, wherein the waste incineration plant has a controllable waste throughput, the steam power of the steam generator can be measured, and the burner power of the auxiliary burner can be controlled.

8. The combustion control system as claimed in claim 7, wherein, to determine the burner power, it is equipped with a measurement device for determining a fuel consumption of the auxiliary burner.

9. The combustion control system as claimed in claim 5, wherein the waste incineration plant has a controllable waste throughput, the steam power of the steam generator can be measured, and the burner power of the auxiliary burner can be controlled.

10. The combustion control system as claimed in claim 6, wherein the waste incineration plant has a controllable waste throughput, the steam power of the steam generator can be measured, and the burner power of the auxiliary burner can be controlled.

11. The combustion control system as claimed in claim 9, wherein, to determine the burner power, it is equipped with a measurement device for determining a fuel consumption of the auxiliary burner.

12. The combustion control system as claimed in claim 10, wherein, to determine the burner power, it is equipped with a measurement device for determining a fuel consumption of the auxiliary burner.

\* \* \* \* \*